US011392840B2

(12) United States Patent
Santhanam et al.

(10) Patent No.: US 11,392,840 B2
(45) Date of Patent: Jul. 19, 2022

(54) SYSTEM AND METHOD FOR GENERATING RECOMMENDATIONS

(71) Applicant: Tata Consultancy Services Limited, Mumbai (IN)

(72) Inventors: Janardhan Santhanam, Chennai (IN); Gaurav Motani, Chennai (IN); Allan Joshua, Chennai (IN)

(73) Assignee: Tata Consultancy Limited Services, Mumbai (IN)

( * ) Notice: Subject to any disclaimer, the term of this patent is extended or adjusted under 35 U.S.C. 154(b) by 848 days.

(21) Appl. No.: 15/094,027

(22) Filed: Apr. 8, 2016

(65) Prior Publication Data
US 2016/0300144 A1 Oct. 13, 2016

(30) Foreign Application Priority Data

Apr. 10, 2015 (IN) .......................... 1517/MUM/2015

(51) Int. Cl.
*G06N 5/04* (2006.01)
*G06N 20/00* (2019.01)
(Continued)

(52) U.S. Cl.
CPC .............. *G06N 5/04* (2013.01); *G06N 20/00* (2019.01); *G06N 20/20* (2019.01); *G06Q 30/0631* (2013.01)

(58) Field of Classification Search
CPC ...................................................... G06N 5/04
See application file for complete search history.

(56) References Cited

U.S. PATENT DOCUMENTS 6,064,980 A  5/2000 Jacobi et al.
6,266,649 B1  7/2001 Linden et al.
(Continued)

FOREIGN PATENT DOCUMENTS

WO   WO 00/62223   10/2000

OTHER PUBLICATIONS

Schafer et al., "E-Commerce Recommendation Applicaitons", Data Mining and Knowlege Discover, 5, 115-153, 2001 (Year: 2001).*
(Continued)

*Primary Examiner* — Miranda M Huang
*Assistant Examiner* — Robert Lewis Kulp
(74) *Attorney, Agent, or Firm* — Finnegan, Henderson, Farabow, Garrett & Dunner, L.L.P.

(57) ABSTRACT

Disclosed is method and system for generating recommendations to a user. System receives real time data associated with users for scenarios and batch data associated with multiple users from different data sources, received from different data channels. The user is online user. System pre-processes batch data and real time data to generate pre-processed data and stores preprocessed data in distributed, scalable big data store. System filters pre-processed data based on rules to obtain filtered data. System applies combination of machine learning techniques on filtered data, based on the scenarios associated with the user, leveraging inter-play between machine learning techniques, to generate personalized recommendations for individual user and storing the personalized recommendations in distributed database. Machine learning techniques are customized to work in distributed processing mode to reduce overall processing time. System recommends user with the personalized recommendations comprising products or services.

17 Claims, 4 Drawing Sheets

(51) Int. Cl.
*G06Q 30/06* (2012.01)
*G06N 20/20* (2019.01)

(56) References Cited

U.S. PATENT DOCUMENTS

| | | | |
|---|---|---|---|
| 6,317,722 | B1 | 11/2001 | Jacobi et al. |
| 6,865,546 | B1* | 3/2005 | Song ............... G06F 17/60 705/26 |
| 7,698,173 | B1 | 4/2010 | Burge et al. |
| 7,949,659 | B2 | 5/2011 | Chakrabarti et al. |
| 8,355,955 | B1 | 1/2013 | Mirchandani et al. |
| 2009/0163183 | A1* | 6/2009 | O'Donoghue ......... G06Q 30/02 455/414.1 |
| 2010/0185507 | A1 | 7/2010 | Tokuda |
| 2010/0191582 | A1* | 7/2010 | Dicker ............... G06Q 30/0633 705/14.51 |
| 2010/0318919 | A1 | 12/2010 | Murphy et al. |
| 2012/0078681 | A1* | 3/2012 | Rahman ............. G06Q 30/0201 705/7.29 |
| 2012/0158622 | A1* | 6/2012 | Mital ............... G06Q 50/01 706/12 |
| 2013/0290110 | A1* | 10/2013 | LuVogt ............... G06F 16/9535 705/14.66 |
| 2014/0122456 | A1* | 5/2014 | Dies ............... G06F 16/24578 707/706 |
| 2015/0112812 | A1* | 4/2015 | Weinsberg ............... G06N 5/00 705/14.66 |
| 2016/0086250 | A1* | 3/2016 | Gunjan ............. G06Q 30/0631 705/26.7 |

OTHER PUBLICATIONS

Jacob, "Beyond the stars: Exploiting free-text user reviews to improve the accuracy of movie recommendations", TSA '09, Nov. 6, 2009. (Year: 2009).*

Sahu et al., "Personalized Recommendation Engine Using Hadoop", 2015 IEEE International COnference on Technologies for Sustainable Development, Feb. 4, 2015 (Year: 2015).*

Das et al., "Google News Personalization: Scalable Online Collaborative Filtering,", WWW 2007/ Track: Industrial Practice and Experience, May 8-12, 2007, 272-280 (Year: 2007).*

Schafer et al. ("Meta-recommendation Systems: User-controlled Integration of Diverse Recommendations", CIKM'02, Nov. 4-9, 2002, pp. 43-51) (Year: 2002).*

Jacob et al. ("Beyond the stars: Exploiting free-text user reviews to improve the accuracy of movie recommendations", TSA '09, Nov. 6, 2009, Hong Kong, China) (Year: 2009).*

Schelter et al. ("Scalable Similarity-Based Neighborhood Methods with MapReduce", RecSys'12, Sep. 9-13, 2012, Ireland, pp. 1-8) (Year: 2012).*

Twardowski et al. ("Multi-agent architecture for real-time Big Data Processing", 2014 IEEE/WIC/ACM International Joint Conferences on Web Intelligence (WI) and Intelligent Agent Technologies (IAT), 2014, pp. 333-337), (Year: 2014).*

Schafer et al. ("E-Commerce Recommendation Applications", Data Mining and Knowledge Discovery, 5, 115-153, 2001) (Year: 2001).*

Kosinski et al. ({Private traits and attributes are predictable from digital records of human behavior PNAS, Apr. 9, 2013, vol. 110, No. 15, pp. 5802-5805} (Year: 2013).*

Abouzeid et al. ("HadoopDB An Architectural Hybrid of Map Reduce and DBMS Technologies for Analytical Workloads", VLDB '09, Aug. 2009, pp. 922-933 (Year: 2009).*

Sachendra Singh Chauhan ("Similarity Search using Locality Sensitive Hashing and Bloom Filter", Computer Science and Engineering Department Thapar University, Master's Thesis, Jun. 2014, pp. 1-46) (Year: 2014).*

Linden, G. et al., "Amazon.com Recommendations Item-to-Item Collaborative Filtering", Industry Report, IEEE Internet Computing, IEEE Computer Society, vol. 7, Issue 1, pp. 76-80, (2003).

Liu, H. et al., "InterestMap: Harvesting Social Network Profiles for Recommendations" Proceedings of IUI Beyond Personalization 2005: A Workshop on the Next Stage of Recommender Systems Research, 6 pgs., (2005).

* cited by examiner

SYSTEM AND METHOD FOR GENERATING RECOMMENDATIONS

PRIORITY CLAIM

This U.S. patent application claims priority under 35 U.S.C. § 119 to India Application No. 1517/MUM/2015, filed on Apr. 10, 2015. The entire contents of the aforementioned application are incorporated herein by reference.

TECHNICAL FIELD

The present subject matter described herein, in general, relates to analytical systems, and more particularly to systems for advanced predictive data analytics.

BACKGROUND

Recommendation systems are becoming very useful and being used for variety of applications. In general, analytics based recommendation systems are being used for recommending items to the user. In one scenario, the recommendation systems are used to generate recommendations based on user's behavior. Existing recommendation systems are facing many issues in generating appropriate recommendations.

With continuously increasing number of Internet users, enormous amount of data is getting generated. Hence, the existing recommendation systems are facing issues in handling large volumes of data. Further, the existing recommendation systems are very generic and the recommendations generated are not personalized. Further, the recommendation systems consider limited scenarios while recommending products to the user. Existing recommendation systems use a single analytical technique to generate recommendations for each scenario, so results in unsuitable recommendations. Hence, the existing recommendation systems fail to consider the user's requirement and propensity to opt the recommendations.

Further, current recommendation systems fail to customize recommendations for anonymous or unknown users, as the current recommendation systems hardly capture any relevant data that can be used to personalize recommendations to the unknown users. The recommendation systems mainly act as a standalone system. Although the recommendation systems have data processing and analytical capabilities, the existing recommendation systems act as a black box for a user who set requirement for the recommendations. Although the recommendation systems give an output to the end user, there is no visibility for the user on backend process. The user has no direct access to the recommendation system to tune the recommendation system as per his requirement.

The current recommendation systems generally process user's data on a batch mode, and hence most recent events are not considered while making recommendations. Even though the recommendation systems apply many rules, resulting recommendations might be totally inappropriate to the user. Thus current recommendation systems fail to persuade the user with the most relevant recommendations for the user.

SUMMARY

Embodiments of the present disclosure present technological improvements as solutions to one or more of the above-mentioned technical problems recognized by the inventors in conventional systems. In view of the foregoing, embodiments herein provide a system and method for generating recommendations.

In one embodiment, a method for generating recommendations is disclosed. The method comprises receiving, by a processor, real time data and batch data. The real time data is associated with a user for one or more scenarios. The batch data is associated with one or more users. The batch data is received from one or more data sources, received from a plurality of data channels. The method further comprises pre-processing, by the processor, the batch data and the real time data, to generate pre-processed data. The method further comprises storing (sending), by the processor, the pre-processed data in a distributed database. The method further comprises filtering, by the processor, the pre-processed data based on one or more rules to obtain filtered data. The method further comprises applying, by the processor, a combination of a plurality of machine learning techniques on the filtered data, based on the one or more scenarios associated with the user, to leverage interplay between the plurality of machine learning techniques, in order to generate a set of personalized recommendations associated with the user individually. The plurality of machine learning techniques are customized to work in a distributed processing mode. The method further comprises recommending, by the processor, the user with the set of personalized recommendations.

In another embodiment, a system for generating recommendations is disclosed. The system comprises a processor and a memory coupled to the processor. The processor is capable of executing a plurality of modules stored in the memory. The plurality of modules comprises a receiving module, a pre-processing module, a filtering module, and a recommendation engine. The receiving module receives real time data and batch data. The real time data is associated with a user for one or more scenarios associated with the user. The batch data is associated with one or more users. The batch data is received from one or more data sources, received from a plurality of data channels. The pre-processing module further pre-processes, the batch data and the real time data, to generate pre-processed data. The pre-processing module further stores the pre-processed data in a distributed database. The filtering module filters the pre-processed data based on one or more rules to obtain filtered data. The recommendation engine applies a combination of a plurality of machine learning techniques on the filtered data, based on the one or more scenarios associated with the user, to leverage interplay between the plurality of machine learning techniques, in order to generate a set of personalized recommendations for the user individually. The plurality of machine learning techniques are customized to work in a distributed processing mode. The recommendation engine further recommends the user with the set of personalized recommendations.

In yet another embodiment, a non transitory computer readable medium having embodied thereon a computer program executed in a computing device for generating recommendations is disclosed. The computer program comprises a program code for receiving real time data and batch data. The real time data is associated with a user for one or more scenarios associated with the user. The batch data is associated with one or more users. The batch data is received from one or more data sources, received from a plurality of data channels. The computer program further comprises a program code for pre-processing the batch data and the real time data, to generate preprocessed data. The computer program further comprises a program code for storing the pre-processed data in a distributed database. The computer program further comprises a program code for filtering the preprocessed data, based on one or more rules, to obtain filtered data. The computer program further comprises a program code for applying a combination of a plurality of machine learning techniques on the filtered data, based on the one or more scenarios associated with the user, to leverage interplay between the plurality of machine learning techniques, in order to generate a set of personalized recommendations for the user individually. The plurality of machine learning techniques are customized to work in a distributed processing mode. The computer program further comprises a program code for recommending the user with the set of personalized recommendations.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
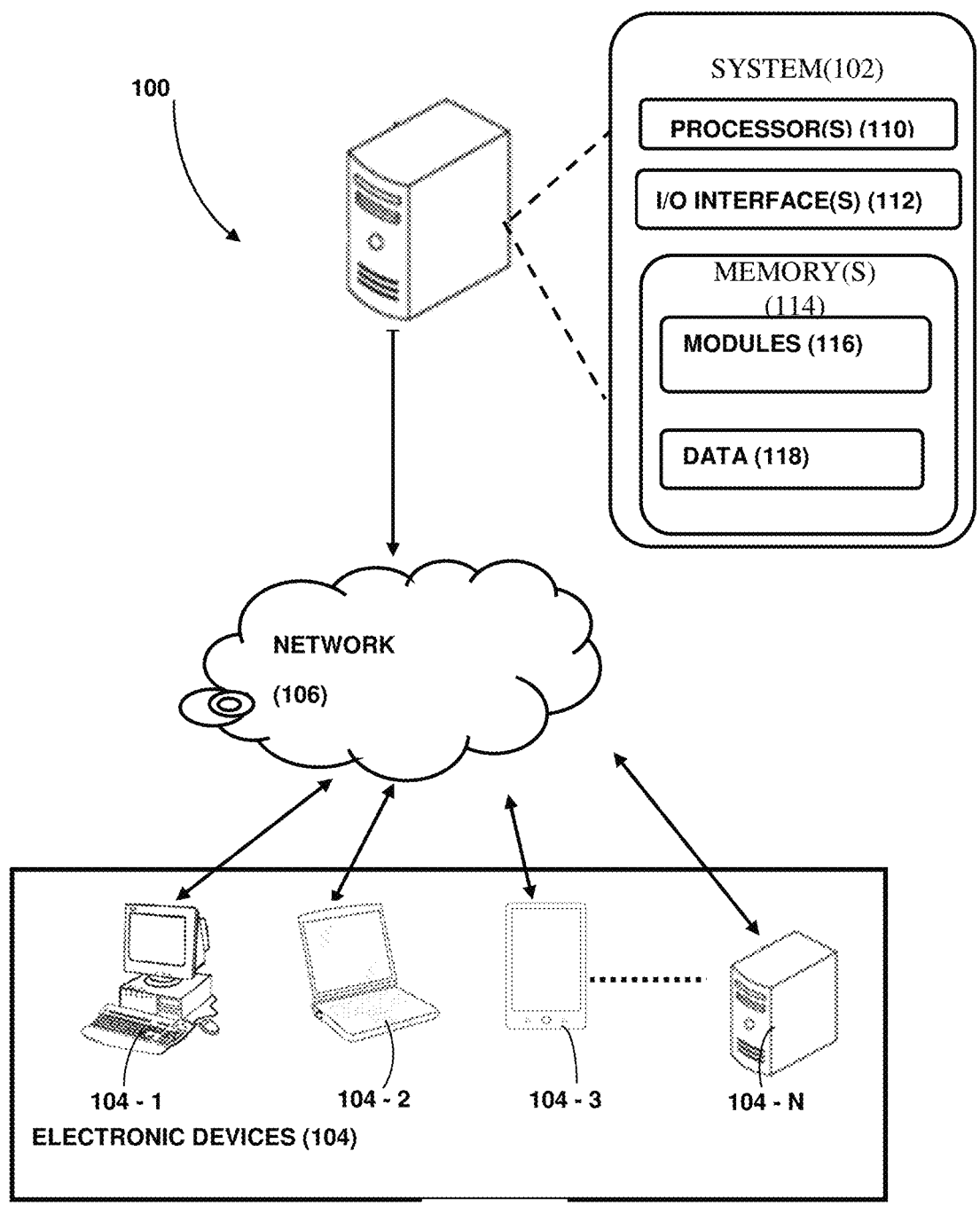
FIG. 1 illustrates a network implementation of a system for generating recommendations, according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Systems and methods for generating recommendations are described. The system and methods may use advanced predictive user data analytics for generating the recommendations. The present subject matter discloses an effective and efficient mechanism for generating the recommendations by leveraging the distributed processing capability of a big data platform and advanced machine learning techniques. The recommendations may be personalized recommendations. In order to generate the personalized recommendations, real time data associated with a user, for one or more scenarios associated with the user, may be received. Further, batch data from one or more data sources, received from a plurality of data channels, associated with one or more users may be received. In one embodiment, the one or more scenarios may comprise different sets of actions performed by the user on different pages of e-Commerce website like a Home Page, a Search Page, a Product description page, and an Order confirmation page, and the like. Subsequent to receiving the real time data and the batch data, the real time data and batch data may be preprocessed to generate preprocessed data. Sub-sequent to pre-processing, the pre-processed data may be stored in a distributed database. The system and method may be capable of self-learning from user actions and may learn the most recent activities as one of inputs to generate the personalized recommendations.

Post storing the pre-processed data, the pre-processed data may be filtered based on one or more rules to obtain filtered data. The one or more rules may be based on business requirement or an administrative requirement or a technical requirement as added by a user. After obtaining the filtered data, a combination of a plurality of machine learning techniques may be applied on the filtered data, based on the one or more scenarios associated with the user, to leverage interplay between the plurality of machine learning techniques, in order to generate a set of personalized recommendations for the user individually. The plurality of machine learning techniques may be customized to work in a distributed processing mode. The set of personalized recommendations may be stored in a distributed database corresponding to every user individually. The user may then be shown top recommendations, from the set of personalized recommendations stored in the distributed database for the user. The user may be an online user.

While aspects of described system and method for generating recommendations may be implemented in any number of different computing systems, environments, and/or configurations, the embodiments are described in the context of the following exemplary system.

Referring now to FIG. 1, a network implementation 100 of a system 102 for generating recommendations is illustrated, according to some embodiments of the present disclosure. In one embodiment, the system 102 may receive real time data and batch data. The real time data may be associated with a user, for one or more scenarios associated with the user. The user may be an online user. The real time data may comprise search terms used by the online user, location of the online user, time of the day associated with the online user, current session details of the online user, and IP address of the online user. The batch data may be associated with one or more users, and the batch data may be received from one or more data sources, received from a plurality of data channels. The plurality of data channels may comprise social media, e-Commerce websites (click stream logs data), mobile data, POS (Point of sale data from stores) Kiosk, email and the like. Post receiving the real time data and the batch data, the system 102 may pre-process the batch data and the real time data, to generate pre-processed data. Post pre-processing, the system 102 may store the pre-processed data in a distributed database. Post storing the pre-processed data, the system 102 may filter the pre-processed data based on one or more rules to obtain filtered data. Post obtaining the filtered data, the system 102 may apply a combination of a plurality of machine learning techniques, to leverage interplay between the plurality of machine learning techniques on the filtered data, based on the one or more scenarios in order to generate a set of personalized recommendations for the user individually. The plurality of machine learning techniques may be customized to work in a distributed processing mode. The set of personalized recommendations may be then stored in the distributed database corresponding to each user. The user may be an online user. Post storing the set of personalized recommendations, the system 102 may recommend the user with the set of personalized recommendations in decreasing order of the user's propensity to buy the recommendations. The set of personalized recommendations may comprise one or more items, one or more products or one or more services.

Although the present subject matter is explained considering that the system 102 is implemented on a server, it may be understood that the system 102 may also be implemented in a variety of computing systems, such as a laptop computer, a desktop computer, a notebook, a workstation, a mainframe computer, a server, a network server, and the like. In one implementation, the system 102 may be implemented in a cloud-based environment. It will be understood that the system 102 may be accessed by multiple users through one or more electronics devices 104-1, 104-2 . . . 104-N, collectively referred to as 104 hereinafter, or applications residing on the one or more electronics devices 104. The one or more electronics (104) devices also comprise one or more data sources. The one or more data sources provide data to the system 102. The examples of the electronics devices 104 may include, but are not limited to, a portable computer, a data server, a personal digital assistant, a handheld device, a workstation, and a retailer database system. The electronics devices 104 are communicatively coupled to the system 102 through a network 106. The electronics devices may be the data sources to provide data to the system 102. The data may be the real time data and the batch data.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Referring now to FIG. 1, the system 102 is illustrated according to some embodiments of the present disclosure. In one embodiment, the system 102 may include at least one processor 110, an input/output (I/O) interface 112, and a memory 114. The at least one processor 110 may be implemented as one or more hardware processors, microprocessors, microcomputers, microcontrollers, digital signal processors, central processing units, state machines, logic circuitries, and/or any devices that manipulate signals based on operational instructions. Among other capabilities, the at least one processor 110 is configured to fetch and execute computer-readable instructions stored in the memory 114.

The I/O interface 112 may include a variety of software and hardware interfaces, for example, a web interface, a graphical user interface, and the like. The I/O interface 112 may allow the system 102 to interact with a user directly or through the electronics devices 104. Further, the I/O interface 112 may enable the system 102 to communicate with other computing devices, such as web servers and external data servers (not shown). The I/O interface 112 can facilitate multiple communications within a wide variety of networks and protocol types, including wired networks, for example, LAN, cable, etc., and wireless networks, such as WLAN, cellular, or satellite. The I/O interface 112 may include one or more ports for connecting a number of devices to one another or to another server.

The memory 114 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 114 may include the programmed instructions and data 116. A computer-readable storage medium refers to any type of physical memory on which information or data readable by a processor may be stored. Thus a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, non-volatile memory, hard drives, CD ROMs, DVDs, flash drives, disks, and any other known physical storage media.

The memory 114 may include modules 116 and data 118. The modules 116 include routines, programs, objects, components, data structures, and programmed instructions and the like, which perform particular tasks or implement particular abstract data types. In one implementation, the modules 116 may include a receiving module 202, a pre-processing module 204, a data transformation and preparation module 206, a data indexer 208, a filtering module 210, a recommendation engine 212 and other modules 214. The other modules 214 may include programs or coded instructions that supplement applications and functions of the system 102 in FIG. 2.

The data 118, amongst other things, serves as a repository for storing data processed, received, and generated by one or more of the modules 116. The data 118 may also include one or more distributed database (s) 216, and other data 218. The other data 218 may include data generated as a result of the execution of one or more modules in the other modules 214.

Figure 2:
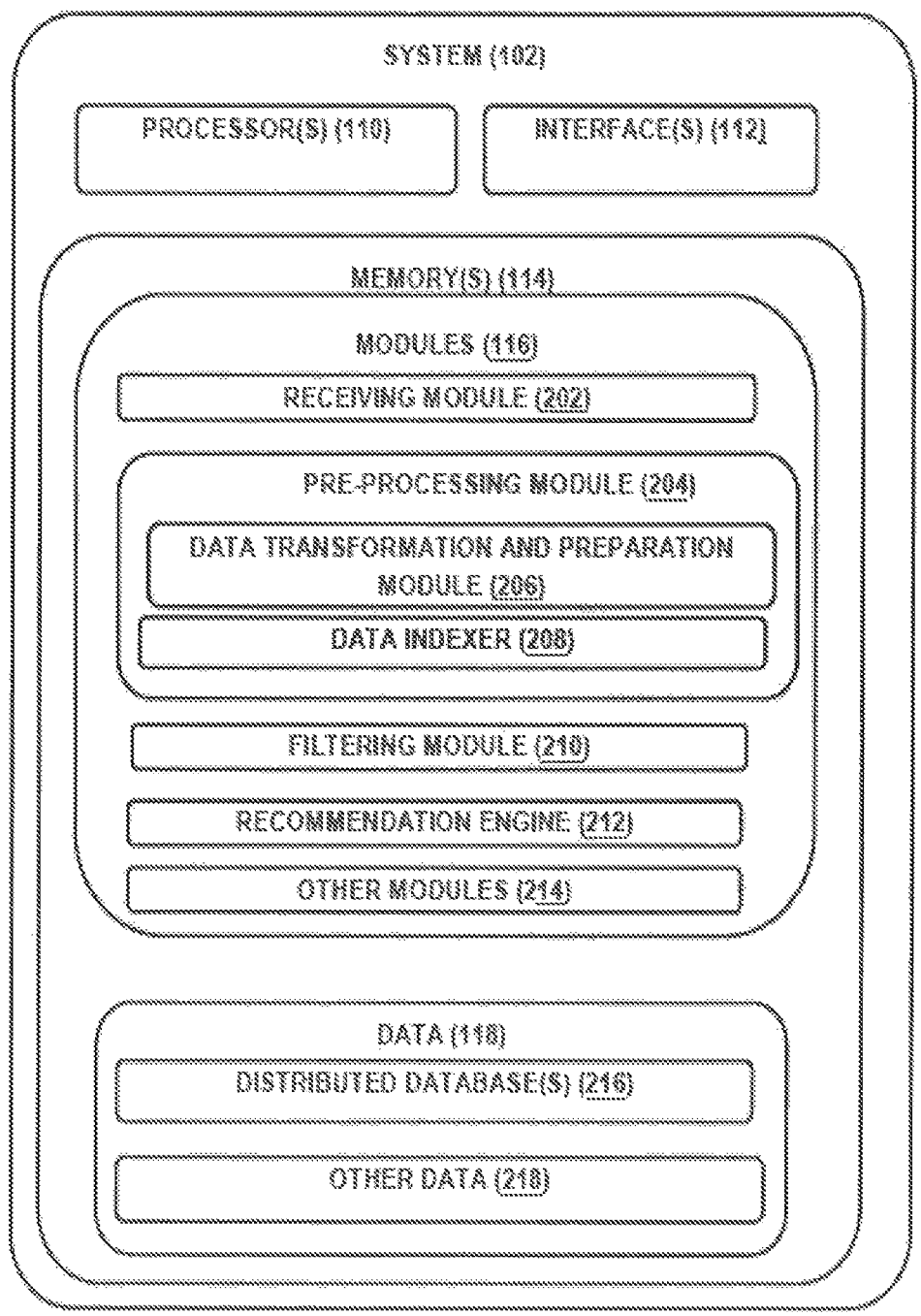
FIG. 2 illustrates the system for generating recommendations, according to some embodiments of the present disclosure.

In one implementation, at first, a user may browse through an e-commerce website of a retailer. Data associated with web logs or click stream of the online user may be captured by the system 102 through network on real time basis to receive real time data. Further, historical data may also be captured by the system 102 on batch mode, as batch data, from one or more data sources. The working of the system 102 may be explained in detail in FIGS. 2 and 3 explained below. The system 102 may be used for recommending products to an online. In one embodiment, the user may be an offline user. Referring to FIG. 2, a functional architecture of the system 102 is described below. Referring to the functional architecture of the system 102, working of the system 102 is described.

Figure 3:
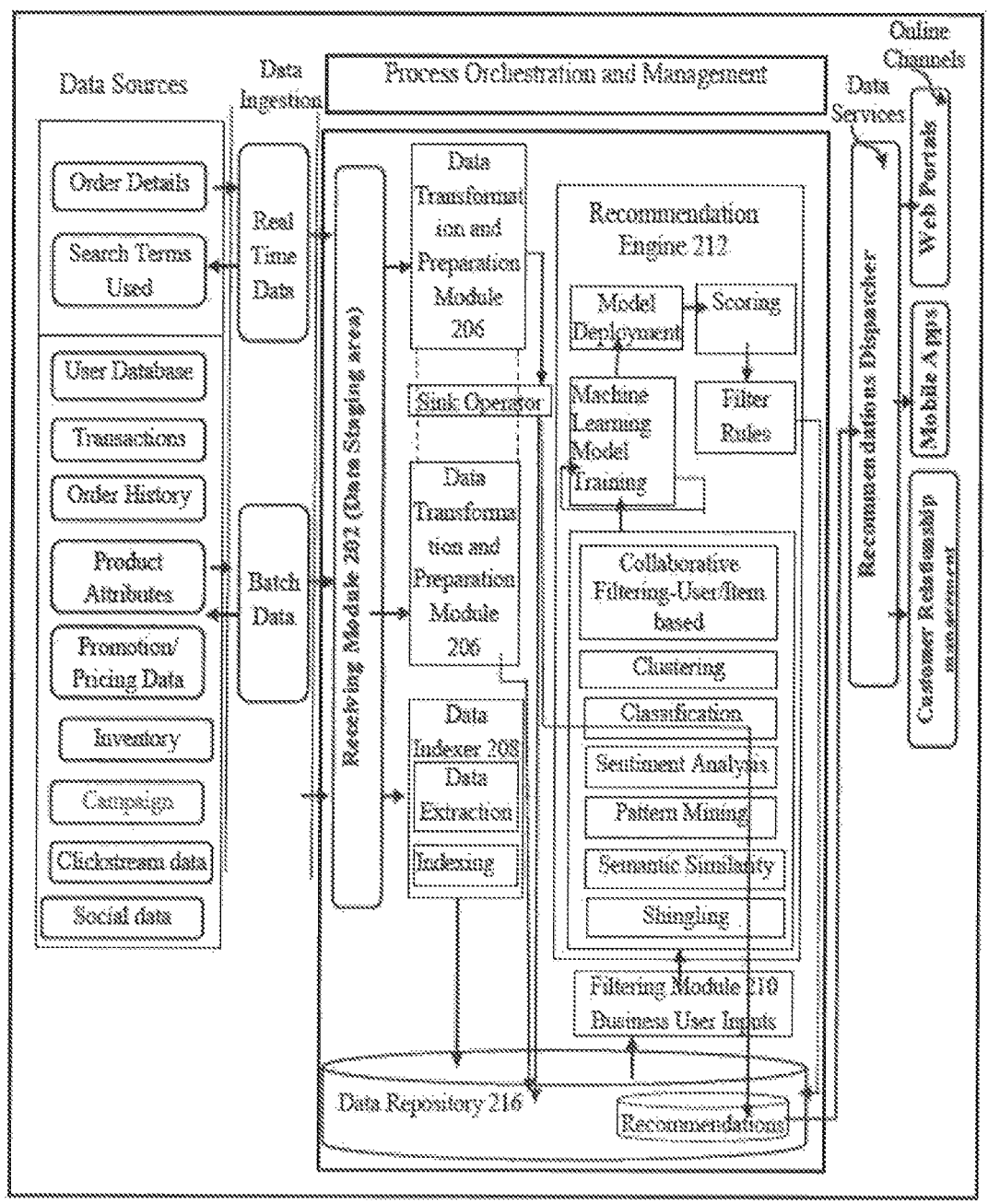
FIG. 3 illustrates a functional architecture of the system for generating recommendations, according to some embodiments of the present disclosure.

Referring to FIG. 2 and FIG. 3, based on a process orchestration and management part of the functional architecture of the system 102, working of the system 102 is explained. In one embodiment, in order to generate recommendations, the receiving module 202 may receive the real time data and the batch data. The receiving module 202 may receive the real time data and the batch data by the techniques known to a person skilled in the art. In one implementation, the real time data may be associated with a user. In one implementation, the user may be an online user. The online user may browse through e-commerce website. The e-commerce website may be belonging to a retailer. Data associated with web logs or click stream of the online user may be captured by the receiving module 202 through network on real time basis as real time data. Further historical data may also be captured on batch mode as batch data from the data sources 104. The real time data may be associated with the online user, for one or more scenarios associated with the online user. The one or ore scenarios may comprise online browsing behavior of the online user. The one or more scenarios may comprise data related to the online browsing behavior of the online user. The online user may be either an unknown user or a known user. Further, for the known user and the unknown user, the one or more scenarios may be developed and implemented in the system 102. Following Table 1 shows the one or more scenarios customized and developed for the known users and the unknown users. The pages browsed by the user may be e-commerce website pages. The pages browsed by the user may be at least one of a Home Page, a Search Page, a Product Description Page and an Order Confirmation Page.

| Sr. No | Page | User | Scenarios (data attributes) | Implementation |
|---|---|---|---|---|
| 1 | Home Page | Known | Inspired By user's browsing History | Online User is assigned to a particular age group product bucket based on his/her buying behavior (items bought, reviewed, added to wish list, items viewed) and activity on social media (items liked, pinned and the like). The most relevant items are then recommended from that assigned age group product bucket based on the consolidated user data. |
| 2 | | | User might also like | Based on the online user's purchase history similar users are identified, and most relevant products are then recommended based on the products bought by similar users |
| 3 | | | Other Chosen items for a user | Items with similar ratings and characteristics are recommended based on items already bought by the users |
| 4 | | Unknown | Top Sellers | When an online user accesses the home page (e-Commerce site) of a retailer, based on a region of the online user (extracted from the IP address) the top selling items are recommended, Additionally business user has an option to configure business rules by assigning weightages to different parameters like newness, highest sales, price sensitivity and the like for short listing top selling products |
| 5 | | | New Arrivals | As part of a business scenario. the trending products in social media which is creating a lot of buzz are recommended. Additionally region specific trending products can also be recommended to the online user |
| 6 | Search Page | Known and Unknown | Users who searched this also viewed | Finding the correlation between search terms used and items viewed by other users and recommending most popular items based on search term used by the online user on real time |
| 7 | | | User may also like | Finding the correlation between search terms used and products bought by other users and recommending most popular items based on the search term used by the online user on real time |
| 8 | | | Clearance deals especially for a user | Recommending items from the clearance database by making an attribute match with those of the items displayed on the search results page |

-continued

| Sr. No | Page | User | Scenarios (data attributes) | Implementation |
|---|---|---|---|---|
| 9 | Product Description Page | Known and Unknown | Users who viewed this product also viewed | Based on the item being viewed by the online user on product description page, the next best item which many other users have viewed are recommended |
| 10 | | | Frequently bought together | Set of items which are frequently bought together along with the item currently being viewed by the online user are recommended |
| 11 | | Known | User who bought this also bought | For every online user, other similar users are identified based on the purchase history and for an item being viewed by the online user on product description page, the next best item which many other similar users bought after buying the item currently being viewed by the online user are recommended |
| 12 | Order Confirmation Page | Known and Unknown | Users who bought this also bought | Recommending those items which most of the other users have predominantly bought along with the item currently bought by the online user |
| 13 | | | Handpicked for a user | Based on the product(s) bought by the online user, the most relevant items in terms of product attributes are recommended from a long tail database |
| 14 | | Known | Recommendations based on user's interest | For every online user, other similar users are identified based on purchase history of the online user. Review comments made by this similar user base is then mined and similar products with high positive sentiment distribution are recommended |
| 15 | | Unknown | Recommendations based on user's interest | Based on the product(s) currently bought by the online user, similar products with high positive overall review sentiments are recommended |

In one implementation, the real time data may comprise search terms used by the user, click stream log details, location, and time and date of browsing of the user. The real time data may be data associated with the user. The real time data may be data generated by the user while browsing on e-commerce website. The real time data may be the data instantaneously received. The real time data may be the data received from the users known to a person skilled in the art. The real time data may be in text, in numerals or in alphanumeric. The real time data may be in a format known to a person skilled in the art.

According to an embodiment, a copy of the real time data or a copy of a part of the real time data may be saved in a recommendation file. The copy of the real time data may be saved through a sink operator, after data transformation and preparation, as applied on the real time data. The sink Operator may be used for transmitting the copy of the real time data to an external system which in present case may be the data repository. The sink operator only in case of real time data may be used to modify a format of the real time data as when needed and further transmitting the real time data so formatted, to the recommendation file (section) of the data repository.

The batch data may be associated with one or more users. In one example, the one or more users may include the online user as well. The batch data may be received from one or more data sources. The batch data may be received from a plurality of data channels into the one or more data sources. The plurality of data channels may comprise mobile data, social media, work stations, retailer database, e-commerce websites (click stream logs data), POS (point of sale data), kiosks, emails and the like. The batch data may comprise user data, order details, transaction details, order history, product attributes, and promotion details, pricing data, inventory, campaign data, click stream data, social media data and the like. The plurality of data channels may comprise other equivalent data channels as mentioned above. The data channels as mentioned above may be data sources. In one implementation, as shown in FIG. 2, the system 102 may combine the real time data so received from the online users to make the most appropriate product recommendations. The real time data may be received from one or more online data sources as well. The batch data may be in text, in numerals or alphanumeric. The batch data may be in a format known to a person skilled in the art. In one implementation, both the real time data generated by an online user and the batch data so consolidated can be analyzed to come up with product recommendations highly personalized and unique to the online user.

The receiving module 202 may combine the batch data so received from the plurality of data channels in a data repository. In one example, the data repository may be the distributed database 216. In one implementation, as shown in FIG. 2, the receiving module 202 may combine the batch data received from the plurality of data channels in the data repository. Referring to FIG. 2, the real time data and the batch data may be moved to the data repository through a data ingestion layer and a data staging layer. In one example, if a person is searching for a mobile. The search terms entered by the user are collected as the real time data. In one example, a list of products bought by other users after searching a term "mobile" in the same session may be collected as the batch data. In an implementation, both the real time and batch data may be used for making personalized product recommendations to the online user. The personalized product recommendations may be unique to the online user.

The process orchestration and management part comprises a data staging layer. The data staging layer is an intermediate data store. The data staging layer is a part of the receiving module 202. A primary function of the receiving module 202 in the data staging layer is to temporarily store the real time data and the batch data.

Further, the preprocessing module 204 pre-processes the batch data and the real time data to generate pre-processed data. The pre-processing module 204 further comprises a data transformation and preparation module 206 to perform merging and cleansing operations on the real time data and the batch data. The data transformation and preparation module 206 may perform the merging and cleansing operations on the real time data and the batch data as per requirement of the user, before actually moving the real time data and the batch data to a data repository. The requirement of the user may be a business requirement, an administrative requirement or a technical requirement.

Post merging and cleansing of the real time data and/or the batch data, data transformation and preparation module may format the real time data and the batch data to ensure that data format of the real time data and the batch data is in sync with the system 102 requirement. The data transformation and preparation module 206 may ensure that the personalized recommendations so generated are more accurate and unique to each user. Data transformation and preparation module 206 may ensure that products/services recommended to the user are unique to each user.

In one implementation, post formatting the real time data and/or the batch data, the data indexer 208 may index the real time data and the batch data before being stored to the data repository in order to facilitate easy retrieval of the real time data and the batch data as and when needed.

In one implementation, data transformation operations may be performed on the real time data to extract only search terms used by the online user from stream of web logs. The search terms are given as an input to the recommendation engine 212. In another implementation, data merging, cleansing and transformation process may be performed on the batch data so as to consolidate attributes related to transactions, social media activity, and online behavior for every single online user.

Subsequent to preprocessing of the real time data and the batch data, the data transformation and preparation module 206 may store the pre-processed data in the data repository. The data repository may be the distributed database 216.

Since the pre-processed data may be in a large volume, the preprocessed data may be stored in the distributed database 216. In one implementation, the distributed database 216 may be Hadoop provided Hbase. The system 102 may be implemented on a big data platform in order to facilitate handling large volumes of data with higher processing speed. The system 102 may be implemented on the big data platform such as Hadoop. Hadoop may be used for distributed storage and further distributed processing of very large data sets of the pre-processed data. Further, the system 102 may use Hadoop distributed file-system (HDFS) for distributed storage. Hadoop Map Reduce functionality for further processing of the pre-processed data. In one implementation, a large volume of the batch data and the real time data may be received as an input to the receiving module 202 of the system 102, and the large volumes of the real time data and the batch data may be processed by the recommendation engine 212 to come up with a set of personalized product recommendations unique to every online user. The processing of large volume of the real time data and the batch data may be expected to happen in shortest time span possible and hence a distributed processing capability of mapreduce is leveraged for processing the large volumes of the real time data and the batch data. The advanced machine learning techniques may be implemented on a mapreduce programming model and the set of personalized product recommendations associated with each online user is stored on Hadoop Hbase for ease of retrieval as and when needed. In another embodiment the pre-processing module may store the pre-processed data in a conventional database system.

Post storing the pre-processed data, the filtering module 210 may filter the pre-processed data based on one or more rules to obtain filtered data. The one or more rules may be based on a business requirement or a technical requirement or an administrative requirement. The one or more rules may be business rules or technical rules or administrative rules. The system 102 is not acting as a black box for a user, as the filtering module 210 of the system 102 may facilitate the user to interact with the filtering module 210 to write or modify the one or more rules. The user may be a business user or an administrator. The user may write the one or more rules. The one or more rules may comprise: tweaking various modifiable attributes associated with items and/or services, marketing, a time period, one or more threshold values for the plurality of machine learning techniques and also to assign weights to the modifiable attributes associated with items or services comprising margin value, units sold, sale value, price attractiveness and the like. The business user or the administrator may create new rules and may implement new rules through the filtering module 210.

According to an embodiment, the filtering module 210 may segment the one or more users based on buying pattern of the one or more users, into different age buckets instead of using actual age values of the one or more users. The one or more users may be online users. In one implementation, the one or more users may be mapped to a particular age bucket based on items bought in the past by the users, items added to wish list, items liked and pinned on social media and the like, by the users. Thus mapping of the one or more users to the corresponding age bucket enables the system 102 to recommend the most suitable products from the mapped age bucket which the online user is most likely to buy. Mapping of the one or more users to the corresponding age bucket results in increasing a conversion rate of the recommendations made to the online user into sale of products.

Post obtaining the filtered data, the recommendation engine 212 may apply a combination of a plurality of machine learning techniques on the filtered data to generate a set of personalized recommendations. The combination of the plurality of machine learning techniques may be applied on the filtered data to leverage interplay between the plurality of machine learning techniques. The system 102 may apply the combination of the plurality of machine learning techniques on the filtered data, based on the one or more scenarios associated with the user, to generate the set of personalized recommendations associated with the user individually.

The plurality of machine learning techniques may be customized to work in a distributed processing mode. For example in one implementation "User might also like" is a first step is to identify similar users by leveraging one of a Similarity technique like Jaccard, cosine, Pearson similarity and the like. Further, a 'Collaborative filtering' (an Item based or a User based) may be applied on top of the 'Similarity technique' to obtain the set of personalized recommendation to the user. In this way more than one machine learning technique is used to make the most relevant personalized recommendations. In one embodiment, the set of personalized recommendations are the most suitable set of personalized recommendation to the user. The set of personalized recommendations may comprise products recommendations or service recommendations or a combination of both.

Post generating the set of personalized recommendations associated with the user, the system 102 may recommend the user with the set of personalized recommendations. The set of personalized recommendations may be products or services which the user is more likely to buy. In one implementation, the user may be the online user. For example, machine learning techniques like Jaccard Similarity and Shingling min-hashing and Locality sensitive hashing are already available but the implementation for the machine learning techniques is not available on a distributed processing model. In present disclosure, the machine learning techniques such as Jaccard Similarity and Shingling are custom coded on MapReduce programming model to work on a distributed processing mode. The custom coding of the machine learning techniques on a big data platform has facilitated in not only enhancing capability to process large volumes of real time data and the batch data but also to complete the processing in short time frames by leveraging the distributed processing capability of MapReduce programming model.

In one implementation, customization of the machine learning techniques to work in the distributed processing mode is explained below. In one example, customization of the machine learning technique such as a Jaccard Similarity technique is explained below. The Jaccard Similarity technique is customized to work on a MapReduce programming model in order to process the data in a distributed processing mode. In one implementation, the data may be filtered data. The Jaccard similarity technique (algorithm) is a measure of similarity among users based on products bought by the users in a selected time frame. A list of users and corresponding products bought by the users is given as an input data to the Jaccard similarity technique. The input data may be given in a custom built file format. The custom built file format may be a Cartesian Input format, wherein each record in the input file contains a Key and Value. The input data is constructed in such a way that each user is compared against every other user.

In one record, key refers to a single user data (Customer Id and a list of products bought) for whom similarity value needs to be computed (For example: User A: {item 1, item 2} and the value refers to all other users (list of User ID's and products bought) against whom a similarity value is to be computed (For example: User B: {item2, item 3}. A mapper function is developed to compare and compute the similarity value between the users. As a part of implementation of the mapper function, every single user is compared against every other user on a one on one basis to compute the similarity value. The logic used to arrive at the similarity value (numerical similarity value) for any two users is a number of common products bought by both the users divided by union of all the products by both the users. The similarity value is calculated by using formula (A∩B/A∪B), where A and B represents the list of products bought by the two users (may be user 1 and user 2) being compared in the selected time frame. The output of the mapper function would be a numerical value between 0 and 1 for every pair of users, wherein 1 refers to very high degree of similarity and 0 refers to no similarity at all. The similarity values so computed for various combinations of users are then stored against the combinations of the users in a database. The similarity values are stored in the database for a ease of retrieval, as and when needed, based on a similarity threshold set by a user, wherein the user who sets a value of the similarity threshold may be an administrator or a business user.

In one embodiment, the recommendation engine 212 may select one or more machine learning techniques from the plurality of machine learning techniques, based on one or more scenarios associated with a user, to develop a machine learning model. The plurality of machine learning techniques may comprise collaborative filtering-user based, a collaborative filtering-item based, clustering, classification, pattern mining, shingling, min hashing, locality sensitive hashing, sentiment analysis or mining and semantic, Pearson, cosine and Jaccard similarity technique. A combination of more than one of the plurality of machine learning techniques are being leveraged for different scenarios associated with the online user. The sentiment analysis may comprise analyzing review comments of the one or more users to obtain distribution of positive, negative and/or neutral sentiments around a product.

Referring to FIG. 3, the development of machine learning model is explained. The development of machine learning model comprises model training, the model deployment, scoring and filtering the rules. In model training, recommendation engine 212 may implement a process of supervised machine learning techniques and unsupervised machine learning techniques based on input data, such as filtered data in the present case. The filtered data may be available based on different scenarios associated with the online user, to be implemented across different pages of an e-Commerce website. In model development, the recommendation engine 212 may build a final analytical model for recommending products/items after doing different iterations as a part of Machine Learning and Model Training phase. Model building is a process of converting statistical and machine learning techniques that tease relationships and patterns from data and expressing them as mathematical equations. In present case, recommendation engine 212 may built the model by converting the machine lea ling techniques that tease relationships and patterns from the filtered data and expressing the machine learning techniques in mathematical equations.

In one embodiment, the recommendation engine 212 may further builds a machine learning model for the combination of the plurality of machine learning techniques so selected based on the one or more scenarios associated with the user. Further, before implementing the machine learning model so built for generating personalized recommendations, the recommendation engine 212 may carry out a scoring process. In the scoring process, the recommendation engine 212 may implement an output of the machine learning model as a pilot or on any one of instances of a production server to view end impact of the sets of personalized recommendations on the users, that is sales uplift. In one implementation, the recommendation engine 212 may implement the machine learning model so built on one or more instances of a production server to obtain a score of impact of the set of personalized recommendations so generated by the machine learning model.

The recommendation engine 212 may further refine the machine learning model by modifying the combination of the plurality of machine learning techniques if the score is less than a threshold value. The recommendation engine 212 may further implement refined machine learning model comprising the combination of the plurality of machine learning techniques so modified to generate the set of personalized recommendations. The refining of the machine learning model enables the recommendation engine 212 in generating more accurate and unique recommendations.

In another scenario, the recommendation engine 212 may apply the combination of the plurality of machine learning techniques of the machine learning model to generate the set of personalized recommendations, if the score is more than or equal to the threshold value.

The model may be tested for efficiency and the set of personalized recommendations given as an output for individual online user may be stored on Hadoop Hbase database. The set of personalized recommendations for every online user stored in the Hbase may be extracted through web services and may be made available on a mobile, a website or a CRM system to the user. One or more sets of personalized recommendations for each user corresponding to the one or more scenarios, may be stored in the distributed database, and the user may be recommended by retrieving at least one of the one or more sets of personalized recommendations based on a current scenario of the user and the real time data associated with the user.

The system 102 is technically advantageous over the conventional or existing recommendation systems. Existing recommendation systems use single machine learning technique per scenario for making recommendations, hence results in poor or irrelevant recommendations for a user. However, the recommendation engine 212 of the system 102 selects a plurality of machine learning techniques based on one or more scenarios associated with the user. The recommendation engine 212 of the system 102 further applies a combination of the plurality of machine learning techniques on the filtered data to generate the set of personalized recommendations. The set of personalized recommendations are associated with the user individually. Since the recommendation engine 212 is selecting the machine learning techniques based on multiple scenarios associated with the user and the multiple scenarios covers exhaustive set of scenarios based a user type and user actions. Further, use of combination of plurality of machine learning techniques based on the one or more scenarios results in leveraging interplay between the plurality of machine learning techniques to enhance performance efficiency of the system 102 to generate more accurate and relevant personalized recommendations.

Further, the selection of the plurality of machine learning techniques based on the one or more scenarios associated with the user and application of the combination of the plurality of machine learning techniques so customized to work on a scalable big data store by the recommendation engine 212, 1) leverages distributed processing capability of the plurality of machine learning techniques so customized, 2) reduces processing time in generation of the set of personalized recommendations and 3) increases accuracy in generation of the set of personalized recommendation, by mining big data.

Referring to FIG. 2 and FIG. 3, as shown in a functional architecture of the system 102, the real time data collected online may also be saved in the data repository after pre-processing. Further, a copy of the real time data may also be saved in a recommendations file stored in the data repository by a sink operator of the system 102. The real time data may also be saved in the recommendations file because in case of unknown user, suitable recommendation may be identified using the real time data, and further displayed to the online user. The filtered data may be moved to a modeling pane as shown in the functional architecture. The business user may have an option to provide one or more business rules to the system 102 as when required based on the business requirement. The one or more rules may be around a time frame for the batch data to be considered for making product recommendations, or product categories to be considered/excluded as part of any particular business scenario while making product recommendations and the like. The filtering may apply the one or more rules on the pre-processed data to be considered for making product recommendations to the user.

The copy of the real time data or the part of the real time data that may be saved through the sink operator may be selected based on the one or more scenarios. In an exemplary embodiment the situation for selection of the real time data for recommendation is explained below. In one example, in one scenario, the online user is on a Search Page. Scenario associated with the online user is 'Clearance deals especially for a user'. The Real time data selected and copied to the recommendation file is 'Search terms entered by the online user'. The implementation logic for the selection of the real time data is: Whenever a user searches for one or more terms on the search page, the list of items displayed on the first search results page are selected and corresponding features to the list of items are extracted on real time. A comparison is then made with the features of the list of items in a promotional database and similar items are recommended on real time basis to the online user.

In second example, the user is browsing an Order Confirmation Page. The Scenario selected for the user is 'Handpicked for a user'. The real time data selected is 'Items bought by the user' The implementation logic for the selected real time data is: The items bought by the online user is considered as an input by the recommendation engine and the properties and features associated with the item are then extracted and a comparison is made with that of the items in the long tail database. Similar items are then displayed as a set of personalized recommendations to the online user.

According to an exemplary embodiment, in following examples, for generating personalized recommendations by using a system 102 is explained. In one example 1, consider an online user Ms. Mary visits a website of one retailer, for the first time, on a Sunday evening, to buy a dress for her birthday. Then the system 102 identifies Ms. Mary as an 'Unknown User' as she has visited the website for the first time. The system 102 sets a type of the user as 'Unknown'. A set of personalized recommendations shown to Ms. Mary comprises products specific to her region based on attributes like product views, newness, price attractiveness and sale status.

Further, the personalized recommendations may also include 'New Arrivals'. The 'New Arrivals' includes products that are considered to have maximum buzz on social media. The real time data collected in the present scenario is IP Address (location), Device and Time of the day.

In one example 2, consider the online user Ms. Mary searches for 'Embroidered black dress' as an 'Unknown User' as she has neither logged in nor registered. The set of personalized recommendations shown to Ms. Mary includes sale deals especially for her, items in the promotional database and search results are used to make the set of personalized recommendation. Further users who searched the same product what Ms. Mary is searching and have also viewed those products are also shown to Ms. Mary. In an implementation, an association is made between the search term used and the items viewed (click stream data) by other users. The real time data collected is IP Address (location), Device and Time of the day. The machine learning techniques used in the present scenario are 1. Shingling, min-hashing and Locality Sensitive Hashing (LSH) and 2. Association Rules.

In example 3, Ms. Mary clicks on 'Lilianna Lace dress' in the set of personalized recommendations section shown to Ms. Mary which captured her attention. For Ms. Mary in present case, the online user type is an 'Unknown user'. Recommendations shown to Ms. Mary are: 1) Users who viewed this product also viewed: Rules mined using the Click stream data and the navigational pattern learnt used to display items based on current session history. 2) Users who bought this item also bought: A user to products mapping is made and rules are mined from the same 3) Frequently bought together: The list of items bought in a single bill is mined. The real time data collected includes IP Address (location), Device and Time of day.

In example 4, having liked the dress so much, Ms. Mary registered in the shopping website and ordered the dress. The online user (User Ms. Mary) type is now a 'Known user'. The recommendations given the user (Ms. Mary) are: 1) Personalized Recommendations based on user's interests: Based on the overall product reviews, products with positive sentiment are recommended. 2) Handpicked for the user: Related long tail products are displayed 3) Users who bought this also bought are also shown: A user to products mapping is made. The data collected includes online user profile, current session browsing history, wish list if any, IP Address, Device and Time of the day. The machine learning techniques used in the present scenario are: 1. Sentiment Analysis 2. Shingling, min-hashing and LSH 3. Association Rules and 4. Similarity Algorithms.

In example 5, Satisfied with the first order, Ms. Mary logs into the same shopping website again after 7 days. Online User (User Ms. Mary) Type is 'Known User'. Personalized recommendation shown to the user: 1) Other chosen items especially for the user: Collaboration done at the item level to display the most suitable items 2) User might also like: Classifying the users into existing segments to identify the closest users and recommending what other similar users bought. 3) Inspired by user's browsing history: Segmentation based on demographics (Age & Location) and performing collaborative filtering. The Data collected includes online user profile, purchase history, current session details, and wish list if any, IP address, device and time of the day.

In example 6, this time Ms. Mary searches for 'full sleeve skirt suit' in the same shopping web site. Online User (User Ms. Mary) Type is 'Known User'. Personalized recommendations shown to the user based on: 1) Inspired by user's interests: Items recommended based on the attributes of the items bought in the past. 2) User may also like: Using past purchase as well as the view history, the rules mined are used from the purchases of other users. The data collected includes Profile, Purchase history, current session details, wish list if any, IP Address, Device and Time of the day.

In example 7, Ms. Mary likes the white round collar skirt suit and clicks the same in the shopping website recommendation section. Online user (Ms. Mary) Type is 'Known User'. Personalized recommendations suggested based on: 1) Frequently bought together: The list of items bought in a single bill is mined. 2) Users who bought this item also bought: A user to products mapping is made. 3) Users who viewed this product also viewed: Collaborative filtering is done on the list of items bought by similar users to recommend suitable items. Real time data collected includes Profile, Purchase history, current session details, and wish list if any, IP Address, Device and Time of the day.

In example 8, Ms. Mary finally completes her second order in the same shopping web site. Online user (Ms. Mary) type is 'Known User', Personalized recommendations shown to the online user based on: 1) Users who bought this also bought: A user to products mapping is made. 2) Recommendations based on user's interests: Based on the past reviews made by the user and overall product reviews, products with positive sentiment are also recommended. 3. Handpicked for the user: Related long tail products are displayed. The data collected includes online user profile, purchase history, current session browsing history, wish list if any, IP Address, Device and Time of the day.

In one embodiment, the recommendation engine 212 may derive personalized recommendations differently for the known user and for unknown user. The recommendation engine 212 may bring a cross-channel 'user' knowledge (including social insights) as a central input. The recommendation engine 212 may enable rich product/service profiling based on attributes like category or type, color, size, price, area of service and the like.

The system 102 may be implemented on a completely open-source big data platform taking advantage of distributed processing capabilities for handling large volumes of the data. The system 102 may have web service based architecture to deliver recommendations to the online users across different data channels like e-Commerce sites, mobile, CRM systems and the like. The recommendation engine 212 may enable caching of a set of personalized product recommendations for increased speed of delivering personalized recommendations. The filtering module 210 may apply filtering techniques to deliver highly personalized t recommendations based on one or more scenarios associated with the users and one or more rules. The filtering module 210 provides enough flexibility to an administrator to create new rules and hence recommendation engine of the system 102 is not a black-box. The recommendation engine 212 configuration or scoring of machine learning techniques may be based on context or scenarios. Further, learning ability of the recommendation engine 212 may be improved by considering additional data sources and frequency of personalized recommendations refreshed for each online user.

The exemplary embodiments discussed above may provide certain advantages. Though not required to practice aspects of the disclosure, these advantages may include those provided by the following features.

Some embodiments enable a system and a method to handle large volumes of real time data and batch data with a very high processing speed.

Some embodiments enable the system and the method for self-learning wherein the self-learning happen based on user's actions.

Some embodiments enable the system and the method for covering a plethora of scenarios associated with a user based on different actions performed by the user.

Some embodiments enable the system and the method for using a combination of more than one machine learning techniques for a plethora of scenarios ensuring a higher degree of personalized recommendations.

Some embodiments enable the system and the method for segmenting the users based on the buying patterns of the users, into different age buckets instead of using actual age values of the users.

Some embodiments enable the system and the method to facilitate an administrator to modify attributes (12+ attributes) associated with the products comprises units sold, Sale value, newness, Sale status, price attractiveness, Margin, time period for the data to be considered and input parameters for the advanced machine learning techniques used to be considered, assigning weights, and creating new rules.

Some embodiments enable the system and the method making near real-time cross channel recommendations, and also include non-linguistic programming (NLP) data as an input to determine user sentiments across different products. The user may be online user. The review comments entered by different users are consolidated and a NLP (Natural Language Processing) based text analytics engine is run on consolidated review comments to extract distribution of positive, negative and neutral sentiments. In one of the implementation, sentiment mining is used to recommend only products with higher distribution of positive sentiments to the online user.

Some embodiments enable a controlled simulation of one or more scenarios associated with the user, set-up a recommendation strategy by a item category or a service category, a web content management process in sync with a recommendation approach.

Figure 4:
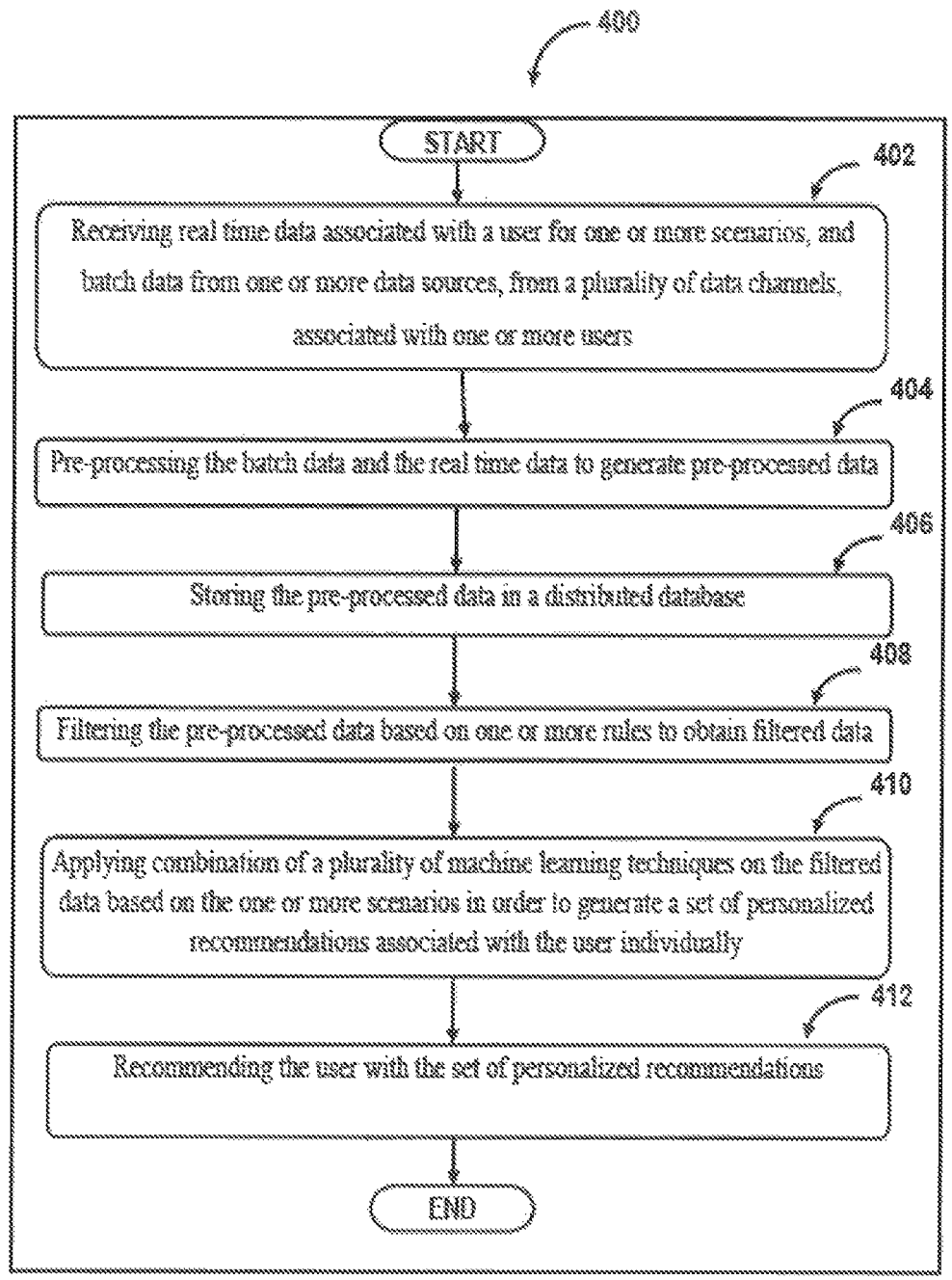
FIG. 4 illustrates a method for generating recommendations, according to some embodiments of the present disclosure.

Referring now to FIG. 4, a method 400 for generating recommendations is illustrated, according to some embodiments of the present disclosure. The method 400 may be described in the general context of computer executable instructions. Generally, computer executable instructions can include routines, programs, objects, components, data structures, procedures, modules, functions, etc., that perform particular functions or implement particular abstract data types. The method 400 may also be practiced in a distributed computing environment where functions are performed by remote processing devices that are linked through a communications network. In a distributed computing environment, computer executable instructions may be located in both local and remote computer storage media, including memory storage devices.

The order in which the method 400 is described is not intended to be construed as a limitation, and any number of the described method blocks can be combined in any order to implement the method 400 or alternate methods. Additionally, individual blocks may be deleted from the method 400 without departing from the spirit and scope of the subject matter described herein. Furthermore, the method can be implemented in any suitable hardware, software, firmware, or combination thereof. However, for ease of explanation, in the embodiments described below, the method 400 may be considered to be implemented in the above described system 102.

At block 402, real time data and batch data may be received. The real time data may be associated with the user for one or more scenarios associated with the user. The batch data may be associated with one or more users. The user may be an online user. The one or more user may also include the online user. The batch data may be received from one or more data sources, received from a plurality of data channels. The one or more data sources may comprise a retailer database, a user database, and a item database. The one or more data sources may be received from the plurality of data channels comprising a store, mobile, web, and social media. The data channels may include but not restricted to a retailer database. In one implementation, the real time data and the batch data may be received by the receiving module 202. The batch data may comprise user historical data, user transaction details, order history, item attributes, promotion details, pricing data, Inventory, Campaign data, Clickstream data, click stream logs, device data, Internet Protocol (IP) address, time stamp data, user location details and Social data.

The one or more scenarios may be associated with activities of an unknown user and activities of a known user, and wherein the one or more scenarios may be related to the user. The user may be an online user. The one or more scenarios may comprise data attributes associated with browsing action of a user. The browsing actions may be associated with one or more website pages, and wherein the one or more website pages may comprise at least one of a home page, a search page, a item description page and an order confirmation page. The one or more scenarios, corresponding to browsing actions of the user may further comprise data attributes related to a home page, a search page, a product/service description page and an order confirmation page. The data attributes related to the home page may comprise 'Inspired By user's Browsing History', 'User might also Like', and 'Other Chosen Items especially for the user'. The data attributes related to the search page may comprise 'Users who searched the terms also viewed', 'User may also like', and 'Clearance deals especially for the user'. The data attributes related to the product/service description page may comprise, 'Users who viewed the same page also viewed', 'Users who bought the items also bought', and 'Frequently bought together'. The data attributes related to the order confirmation page further comprise 'Users who bought the items also bought', 'Handpicked for the user', and 'Recommendations based on the user's Interest'.

At block 404, the batch data and the real time data may be pre-processed to generate pre-processed data. In one implementation, the batch data and the real time data may be pre-processed by the pre-processing module 204 to generate the pre-processed data.

At block 406, the pre-processed data may be stored in a distributed database. In one implementation, the pre-processed data may be stored by the system 102 in the distributed database. The distributed database may be a scalable big data store. In one example, the pre-processed data may be stored in a distributed database such as a Hadoop provided Hbase by the pre-processing module 204.

At block 408, the pre-processed data may be filtered based on one or more rules to obtain filtered data. The filtered data is provided as an input to the recommendation engine. In one implementation, the preprocessed data may be filtered based on the one or more rules by the filtering module 210 to obtain the filtered data.

At block 410, a combination of a plurality of machine learning techniques may be applied on the filtered data, based on the one or more scenarios in order to generate a set of personalized recommendations. The plurality of machine learning techniques may be applied on the filtered data, based on the plurality of scenarios, to leverage interplay between the plurality of machine learning techniques. The plurality of machine learning techniques may be customized to work in a distributed processing mode. In one implementation, the combination of the plurality of machine learning techniques may be applied on the filtered data by the recommendation engine 212 in order to generate the set of personalized recommendations for individual online user. The set of personalized recommendations associated with each user may be stored in the distributed database corresponding to the each user.

At block 412, the user may be recommended with the set of personalized recommendations. Thus the user may be recommended with the set of personalized recommendations based on the one or more scenario and a user's buying behavior. In one implementation, the user may be recommended by the system 102 with the set of personalized recommendations based on the one or more scenarios, applied rules and online buying behavior of the user. And storing the set of personalized recommendations for plurality of users on the Hbase corresponding to every individual user. In one embodiment, the user may be recommended with items or/and services based on the set of personalized recommendations and the real time data, when the user is an unknown user or a known user.

In one embodiment of the method 400, one or more sets of personalized recommendations for each user corresponding to the one or more scenarios, may be stored in the distributed database, and the user may be recommended by retrieving at least one of the one or more sets of personalized recommendations based on a current scenario of the user and the real time data associated with the user. The method 400 may further comprise recommending the user with items based on the set of personalized recommendations and the real time data, when the user is an unknown user or a known user. In one implementation, the user may recommended by the recommendation engine 212, by retrieving the at least one of the one or more sets of personalized recommendations based on the current scenario of the user and the real time data associated with the user.

The method 400 may further comprise using Natural language Processing (NLP) based Text analytics techniques to mine user sentiments around review comments associated with items or services to further recommend, items or services with positive sentiment distribution, to the user. In one implementation, the Natural language Processing (NLP) based Text analytics techniques may be used by the recommendation engine 212 to mine user sentiments around review comments associated with items or services to further recommend the user the items or services with positive sentiment distribution.

The method 400 may further comprise providing a control feature enabling a user to write the one or more rules or to modify the one or more rules associated with user browsing website pages comprising at least one of a home page, a search page, a item description page and an order confirmation page; and the business user modify rules or creates new rules as per requirement by tweaking attributes associated with items, marketing, time period, threshold values for the plurality of machine learning techniques, and assign weights to the attributes comprising a margin, one or more units sold, a sale value, and a price attractiveness. In one implementation, the filtering of the pre-processed data based on the one or more rules enables a user to create the one or more rules or modify the one or more rules associated with the one or more scenarios. The one or more rules may further comprise modifiable attribute values associated with items or services, a time period, threshold values for the plurality of machine learning techniques, and assign weights to the attributes comprising a margin value, one or more units sold, a sale value, and a price.

The method 400 further comprises selecting a plurality of machine learning techniques based on the one or more scenarios associated with the user. The method 400 further comprises building a machine learning model for the combination of the plurality of machine learning techniques selected based on the one or more scenarios associated with the user. The method 400 further comprises implementing the machine learning model so built on one or more instances of a production server to obtain a score of impact of the set of personalized recommendations so generated by the machine learning model. The method 400 further comprises refining the machine learning model by modifying the combination of the plurality of machine learning techniques if the score is less than a threshold value; and implementing the combination of the plurality of machine learning techniques so modified to generate the set of personalized recommendations. In one implementation, selecting a plurality of machine learning techniques, building the machine learning model, implementing the machine learning model, and refining the machine learning model by the recommendation engine 212.

The method 400 further comprises applying the combination of the plurality of machine learning techniques of the machine learning model, if the score is more than or equal to the threshold value to generate the set of personalized recommendations. In one implementation, the recommendation engine 212 may apply the combination of the plurality of machine learning techniques of the machine learning model. The selection of the plurality of machine learning techniques based on the one or more scenarios associated with the user and application of the combination of the plurality of machine learning techniques customized to work on a scalable big data store: 1) leverages distributed processing capability of the plurality of machine learning techniques so customized, 2) reduces processing time in generation of the set of personalized recommendations and 3) increases accuracy of generation of the set of personalized recommendations, by mining big data.

Although implementations for methods and systems for generating recommendations has been described in language specific to structural features and/or methods, it is to be understood that the appended claims are not necessarily limited to the specific features or methods described. Rather, the specific features and methods are disclosed as examples of implementations for generating recommendations.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

It is intended that the disclosure and examples be considered as exemplary only, with a true scope and spirit of disclosed embodiments being indicated by the following claims.

What is claimed is:

1. A processor-implemented method for generating personalized recommendations in real time using predictive user data obtained from one or more users, the method comprising:

receiving, by one or more hardware processors, real time data associated with a user including search terms by the user, click stream log details, location, time and date of browsing, wherein copy of the real time data is saved in a recommendation file through a sink operator for transmitting the copy of the real time data to a data repository, wherein the sink operator only in case of the real time data modifies a format of the real time data and transmits the formatted real time data to the recommendation file of the data repository, wherein the real-time data corresponds to a plurality of scenarios associated with the user identified as type of the user as an unknown user visiting a website for a first time or unregistered in the website, or a known user visiting the website after registering in the website, and wherein the plurality of scenarios are developed for the unknown user and the known user and comprise online browsing actions performed at a website including a home page, a search page, a product description page and an order confirmation page, wherein the online browsing actions are self-learnt by a system and most recent activities are learned for generating personalized recommendation and the learning ability of a recommendation engine in the system is improved by considering additional data sources and frequency of personalized recommendations refreshed for an online user; and batch data associated with one or more users, from one or more data sources the batch data being, received from a plurality of data channels by the one or more data sources, wherein the real time data and the batch data are moved to the data repository through a data staging layer to temporarily store the real time data and the batch data;

pre-processing, by the one or more hardware processors, the batch data and the real time data, to generate pre-processed data, wherein the pre-processing comprises:

merging and cleansing the real-time data and the batch data, wherein merging includes transforming the real-time data and the batch data to sync with a system requirement, wherein transformation of the real time data extract only the search terms used by the user from stream of web logs; and indexing the merged and cleansed real-time data and the batch data to obtain the pre-processed data;

storing, by the one or more hardware processors, the pre-processed data in a distributed database;

filtering, by the one or more hardware processors, the preprocessed data based on one or more rules to obtain filtered data that is moved to a modeling pane in a functional architecture, wherein the filtering comprises:

receiving inputs to create or modify the one or more rules associated with the plurality of scenarios, wherein the one or more rules are around a time frame for the batch data is considered for making product recommendations, or product categories is considered or excluded as part of the plurality of scenarios, wherein the one or more rules further comprises modifiable attributes associated with items or services, a time period, threshold values for a plurality of machine learning techniques, and assign weights to the modifiable attributes;

enabling a controlled simulation of the plurality of scenarios associated with the user, setting-up a recommendation strategy by the items or services, and a web content management process in sync with a recommendation approach;

mapping the user to a particular age bucket based on items bought in the past by the users, items added to wish list, items viewed, items reviewed, items liked and pinned on social media;

building a machine learning model for a combination of a plurality of machine learning techniques selected from a list of machine learning techniques based on the plurality of scenarios associated with the user, wherein each of the machine learning techniques is built on a MapReduce model to handle the filtered data from the distributed database and works in a distributed processing mode, wherein the plurality of machine learning techniques includes an user-based collaborative filtering, an item-based collaborative filtering, clustering, classification, pattern mining, Shingling, min hashing, locality sensitive hashing, a sentiment analysis or sentiment mining, and semantic analysis, a Pearson similarity, a cosine similarity and a Jaccard similarity technique, wherein the machine learning techniques including Jaccard similarity and Shingling are custom coded on the MapReduce model to enhance capability to process large volumes of the real time data and the batch data and complete processing of the real time data and the batch data in short time frames by leveraging distributed capability of the MapReduce model, wherein an input file to the Jaccard similarity is provided in a Cartesian input format with each record in the input file containing a key and a value, wherein the key refers to a single user data for whom similarity value needs to be computed and the value refers to all other users against whom a similarity value is to be computed;

applying, by the one or more hardware processors, the machine learning model built with the combination of a plurality of machine learning techniques, to leverage interplay between the machine learning techniques, on the filtered data based on the particular age bucket mapped with the user;

generating, by the one or more hardware processors, a set of personalized recommendations associated with the known user differently from the unknown user based on the applied plurality of machine learning techniques;

implementing the machine leaning model built on one or more instances of a production server to obtain a score of impact of the set of personalized recommendations generated by the machine learning model;

refining the machine learning model by modifying combination of the plurality of machine learning techniques if the score of impact is less than a threshold value;

applying the modified combination of the plurality of machine learning techniques; and generating a set of personalized recommendations based on the modified combination of plurality of machine learning techniques.

2. The method of claim 1, wherein the one or more data sources, comprises a retailer database, a user database, a product database, and a service database, wherein the one or more data sources are received from a plurality of data channels comprising a store, mobile, web, and social media.

3. The method of claim 1, wherein the batch data comprises user history data, user activity data, user transaction details, order history, product attributes, service attributes, pricing data, Inventory data, Clickstream data, click stream logs, device data, Internet Protocol (IP) address, time stamp data, user location details and Social data.

4. The method of claim 1, further comprises applying the combination of the plurality of machine learning techniques of the machine learning model, if the score is more than or equal to the threshold value to generate the set of personalized recommendations.

5. The method of claim 1, further comprises recommending the online user with the set of personalized recommendations in decreasing order of user's propensity to buy the recommendations, wherein the set of personalized recommendations comprises at least one of items or services.

6. The method of claim 1, wherein the selection of the plurality of machine learning techniques based on the plurality of scenarios associated with the user, and application of combination of the plurality of machine learning techniques so customized to work on a scalable big data store leverages distributed processing capability of the plurality of machine learning techniques so customized by mining big data.

7. The method of claim 1, further comprises storing one or more sets of personalized recommendations for each user, corresponding to the plurality of scenarios, in the distributed database, and generating recommendations by retrieving at least one of the one or more sets of personalized recommendations based on current scenario of the user and the real time data associated with the user.

8. The method of claim 1, further comprises generating recommendations comprising items or services based on the set of personalized recommendations and the real time data.

9. The method of claim 1, wherein the distributed database is a scalable big data store.

10. The method of claim 6, wherein the plurality of scenarios, corresponding to the browsing actions of the user further comprise: data attributes related to a home page comprising 'Inspired By user's Browsing History', 'User might also Like', and 'Other Chosen Items especially for the user'; data attributes related to a search page comprising 'Users who searched the terms also viewed', 'User may also like', 'Clearance deals especially for the user'; data attributes related to an item/a service description page comprising 'Users who viewed the same page also viewed', 'Users who bought the items also bought', and 'Frequently bought together', and data attributes related to an order confirmation page comprising 'Users who bought the items also bought', 'Handpicked for the user', and 'Recommendations based on the user's Interest'.

11. The method of claim 1, wherein the real time data comprises search terms used by the user, location of the user, time of the day associated with the user, current session details of the user, and an IP address of the user.

12. The method of claim 1, further comprises using Natural language Processing (NLP) based Text analytics techniques to mine user sentiments around review comments associated with products or services to further generate recommendations with positive sentiment distribution.

13. The method of claim 1, wherein the modifiable attributes comprising a margin value, one or more units sold, a sale value, and a price.

14. A system for generating personalized recommendations in real time using predictive user data obtained from one or more users, the system comprising:

a processor; and a memory coupled to the processor, wherein the processor is capable of executing a plurality of modules stored in the memory, the plurality of modules comprising:

a receiving module receives, real time data associated with a user including search terms by the user, click stream log details, location, time and date of browsing, wherein copy of the real time data is saved in a recommendation file through a sink operator for transmitting the copy of the real time data to a data repository, wherein the sink operator only in case of the real time data modifies a format of the real time data, and transmit the formatted real time data to the recommendation file of the data repository, wherein the real-time data corresponds to a plurality of scenarios associated with the user identified as type of the user as an unknown user visiting a website for a first time or unregistered in the website, or a known user visiting the website after registering in the website, and wherein the plurality of scenarios are developed for the unknown user and the known user and comprise online browsing actions performed at a website including a home page, a search page, a product description page and an order confirmation page, wherein the online browsing actions are self-learnt by a system and most recent activities are learned for generating personalized recommendation and the learning ability of a recommendation engine in the system is improved by considering additional data sources and frequency of personalized recommendations refreshed for an online user; and batch data associated with one or more users, from one or more data sources the batch data being, received from a plurality of data channels by the one or more data sources, wherein the real time data and the batch data are moved to the data repository through a data staging layer to temporarily store the real time data and the batch data;

a pre-processing module, pre-processes the batch data and the real time data to generate pre-processed data, wherein the pre-processing comprises:

merging and cleansing the real-time data and the batch data, wherein merging includes transforming the real-time data and the batch data to sync with a system requirement, wherein transformation of the real time data extract only the search terms used by the user from stream of web logs; and indexing the merged and cleansed real-time data and the batch data to obtain the pre-processed data;
stores the pre-processed data in a distributed database;
a filtering module filters the preprocessed data based on one or more rules to obtain filtered data that is moved to a modeling pane in a functional architecture, wherein the filtering comprises:
  receiving inputs to create or modify the one or more rules associated with the plurality of scenarios, wherein the one or more rules are around a time frame for the batch data is considered for making product recommendations, or product categories is considered or excluded as part of the plurality of scenarios, wherein the one or more rules further comprises modifiable attributes associated with items or services, a time period, threshold values for a plurality of machine learning techniques, and assign weights to the modifiable attributes;
  mapping the user to a particular age bucket based on items bought in the past by the users, items added to wish list, items viewed, items reviewed, items liked and pinned on social media;
  enabling a controlled simulation of the plurality of scenarios associated with the user, setting-up a recommendation strategy by the items or services, and a web content management process in sync with a recommendation approach;
  building a machine learning model for a combination of a plurality of machine learning techniques selected from a list of machine learning techniques based on the plurality of scenarios associated with the user, wherein each of the machine learning techniques is built on a MapReduce model to handle the filtered data from the dis-tributed database and works in a distributed processing mode, wherein the plurality of machine learning techniques includes an user-based collaborative filtering, an item-based collaborative filtering, clustering, classification, pattern mining, Shingling, min hashing, locality sensitive hashing, a sentiment analysis or sentiment mining and semantic analysis, a Pearson similarity, a cosine similarity and a Jaccard similarity technique,
wherein the machine learning techniques including Jaccard similarity and Shingling are custom coded on the MapReduce model to enhance capability to process large volumes of the real time data and the batch data and complete processing of the real time data and the batch data in short time frames by leveraging distributed capability of the MapReduce model, wherein an input file to the Jaccard similarity is provided in a Cartesian input format with each record in the input file containing a key and a value, wherein the key refers to a single user data for whom similarity value needs to be computed and the value refers to all other users against whom a similarity value is to be computed;
a recommendation engine
  applies the machine learning model built with the combination of a plurality of machine learning techniques, to leverage interplay between the machine learning techniques, on the filtered data based on the particular age bucket mapped with the user;
  generating a set of personalized recommendations associated with the known user differently from the unknown user based on the applied plurality of machine learning techniques;
implementing the machine leaning model built on one or more instances of a production server to obtain a score of impact of the set of personalized recommendations generated by the machine learning model;
refining the machine learning model by modifying combination of the plurality of machine learning techniques if the score of impact is less than a threshold value;
applying the modified combination of the plurality of machine learning techniques; and
generating a set of personalized recommendations based on the modified combination of plurality of machine learning techniques.

15. The system of claim 14, wherein the plurality of scenarios, corresponding to browsing actions of the user further comprise: data attributes related to a home page comprising 'Inspired By user's Browsing History', 'User might also Like', and 'Other Chosen Items especially for the user'; data attributes related to a search page comprising 'Users who searched the terms also viewed', 'User may also like', 'Clearance deals especially for the user'; data attributes related to an item/a service description page comprising 'Users who viewed the same page also viewed', 'Users who bought the items also bought', and 'Frequently bought together', and data attributes related to an order confirmation page comprising 'Users who bought the items also bought', 'Hand-picked for the user', and 'Recommendations based on the user's Interest'.

16. The system of claim 14, wherein selection of the plurality of machine learning techniques based on the plurality of scenarios associated with the user and application of combination of the plurality of machine learning techniques customized to work on a scalable big data store leverages distributed processing capability of the plurality of machine learning techniques so customized, by mining big data.

17. A non transitory computer readable medium having embodied thereon a computer program executed in a computing device for generating personalized recommendations in real time using predictive user data obtained from one or more users, the computer program comprising:
  a program code for receiving,
    real time data associated with a user including search terms by the user, click stream log details, location, time and date of browsing, wherein copy of the real time data is saved in a recommendation file through a sink operator for transmitting the copy of the real time data to a data repository, wherein the sink operator only in case of the real time data modifies a format of the real time data, and transmit the formatted real time data to the recommendation file of the data repository, wherein the real-time data corresponds to a plurality of scenarios associated with the user identified as type of the user as an unknown user visiting the website for a first time or unregistered in the website, or a known user visiting a website after registering in the website, and wherein the plurality of scenarios are developed for the unknown user and the known user and comprise online browsing actions performed at a website including a home page, a search page, a product description page and an order confirmation page, wherein the online browsing actions are self-learnt by a system and most recent activities are learned for generating personalized recommendation and the learning ability of a recommendation engine in the system is improved by considering additional data sources and frequency of personalized recommendations refreshed for an online user; and
    batch data associated with one or more users, from one or more data sources the batch data being, received from a plurality of data channels by the one or more data sources, wherein the real time data and the batch data are moved to the data repository through a data staging layer to temporarily store the real time data and the batch data;

a program code for pre-processing the batch data and the real time data to generate pre-processed data, wherein the pre-processing comprises:
  merging and cleansing the real-time data and the batch data, wherein merging includes transforming the real-time data and the batch data to sync with a system requirement, wherein transformation of the real time data extract only the search terms used by the user from stream of web logs; and
  indexing the merged and cleansed real-time data and the batch data to obtain the pre-processed data;

a program code for storing the pre-processed data in a distributed database;

a program code for filtering the pre-processed data based on one or more rules to obtain filtered data that is moved to a modeling pane in a functional architecture, wherein the filtering comprises:
  receiving inputs to create or modify the one or more rules associated with the plurality of scenarios, wherein the one or more rules are around a time frame for the batch data is considered for making product recommendations, or product categories is considered or excluded as part of the plurality of scenarios, wherein the one or more rules further comprises modifiable attributes associated with items or services, a time period, threshold values for a plurality of machine learning techniques, and assign weights to the modifiable attributes;
  enabling a controlled simulation of the plurality of scenarios associated with the user, setting-up a recommendation strategy by the items or services, and a web content management process in sync with a recommendation approach;
  mapping the user to a particular age bucket based on items bought in the past by the users, items added to wish list, items viewed, items reviewed, items liked and pinned on social media;

a program code for building a machine learning model for a combination of a plurality of machine learning techniques selected from a list of machine learning techniques based on the plurality of scenarios associated with the user, wherein each of the machine learning techniques is built on a MapReduce model to handle the filtered data from the distributed database and works in a distributed processing mode, wherein the plurality of machine learning techniques includes an user-based collaborative filtering, an item-based collaborative filtering, clustering, classification, pattern mining, Shingling, min hashing, locality sensitive hashing, a sentiment analysis or sentiment mining, and semantic analysis, a Pearson similarity, a cosine similarity and a Jaccard similarity technique,
  wherein the machine learning techniques including Jaccard similarity and Shingling are custom coded on the MapReduce model to enhance capability to process large volumes of the real time data and the batch data and complete processing of the real time data and the batch data in short time frames by leveraging distributed capability of the MapReduce model, wherein an input file to the Jaccard similarity is provided in a Cartesian input format with each record in the input file containing a key and a value, wherein the key refers to a single user data for whom similarity value needs to be computed and the value refers to all other users against whom a similarity value is to be computed;

a program code for applying the machine learning model built with the combination of a plurality of machine learning techniques, to leverage interplay between the machine learning techniques, on the filtered data based on the particular age bucket mapped with the user;

a program code for generating a set of personalized recommendations associated with the known user differently from the unknown user based on the applied plurality of machine learning techniques, wherein the plurality of machine learning techniques are customized to work in a distributed processing mode;

a program code for implementing the machine leaning model built on one or more instances of a production server to obtain a score of impact of the set of personalized recommendations generated by the machine learning model;
  refining the machine learning model by modifying combination of the plurality of machine learning techniques if the score of impact is less than a threshold value;
  applying the modified combination of the plurality of machine learning techniques; and
  generating a set of personalized recommendations based on the modified combination of plurality of machine learning techniques.

* * * * *